Patented Nov. 12, 1929

1,735,793

UNITED STATES PATENT OFFICE

DONALD C. REED, OF DUNEDIN, FLORIDA

COMPOSITION FOR COATING BRICK, TILE, OR CEMENT

No Drawing. Application filed February 11, 1928. Serial No. 253,786.

This invention relates to means for giving an artificial colored coating to brick, tile or concrete work, and particularly to means for applying this coating to the work while the work is wet.

The general object of this invention is to provide a coating of this character which will not be affected by the weather and of such character that the face of the work may be stippled, raked or otherwise ornamented.

Other objects will appear more fully in the following description.

In carrying out my method of forming a coating upon work and where plain colors are to be used, I take twelve parts of any color desired, six parts of hydrated lime, eight parts of iron dust or filings, and mix these with approximately ninety-six parts of pure Portland cement. The ingredients are thoroughly stirred together and mixed so as to obtain a uniform mixture and tint. The mixture is then wet with 50% of any cement waterproofing liquid and 50% of water. I may use any cement waterproofing liquid, such as those commonly found on the market, thus for instance I am using the waterproofing paste which forms the subject matter of Patent 1,036,898, granted on August 27, 1912; this paste consisting of a small proportion of ammonia with a water repellant and insoluble soap, such as aluminum palmitate and calcium stearate; or paraffin emulsified with kerosene and soap water, as described in Patent 1,599,903 granted September 14, 1926. When the composition has been applied to wet or unset brick, tile or concrete block while these are still in a wet condition, it is well evened or stippled and then a small amount of ground mica is dusted on the surface with a blower, which makes a very attractive finish. I do not wish to be limited to this, however, as the face of the work can be left stippled or raked, as desired.

The finish so produced is superior to any known to me, as the hydrated lime keeps the cement from becoming rigid or hardening too rapidly, the fine iron filings or dust give the surface a flinty character, and the waterproofing material incorporated with the cement keeps out the water, and, of course, any desired color may be used. This coating has been carefully tested by exposure to weather, both in winter and summer, and the weather apparently has no effect on it. Many different colors may be used so that even using a few colors and mixing them, about thirty different colors and shades and tints thereof may be secured. It is to be understood that this method of applying a coloring coating is applicable to any work, brick or tile, particularly when the work is in a moist condition.

I before referred to the use of finely powdered iron and preferably this is in the form of finely powdered oxide of iron. The hydrated lime is to prevent the cement from setting quite so quickly as it otherwise would do and further improves the product by giving the binder coat more time to engage with and form part of the wet concrete. The composition is applied while the brick or tile is still wet in the mold and this facing, therefore, becomes a unified part of the work when set up. Waterproof liquid is to be used on the cement blocks and all other work. This is a very important part of my formula.

I claim:—

1. A coloring composition for brick, tile, etc., including a powdered color, hydrated lime, finely powdered iron, and Portland cement.

2. A coloring composition for brick, tile, etc., including a powdered color, hydrated lime, finely powdered iron, Portland cement, water, and water-proofing liquid.

3. A color composition for brick, tile, etc., consisting of a mixture of powdered color, hydrated lime, finely divided iron, Portland cement, and a vehicle consisting of 50% of cement water-proofing compound and 50% water.

In testimony whereof I hereunto affix my signature.

DONALD C. REED.